July 17, 1956  D. M. RYDEN  2,754,743
SIDE DRAFT CONTROL ATTACHMENT
Filed May 4, 1954  3 Sheets-Sheet 3

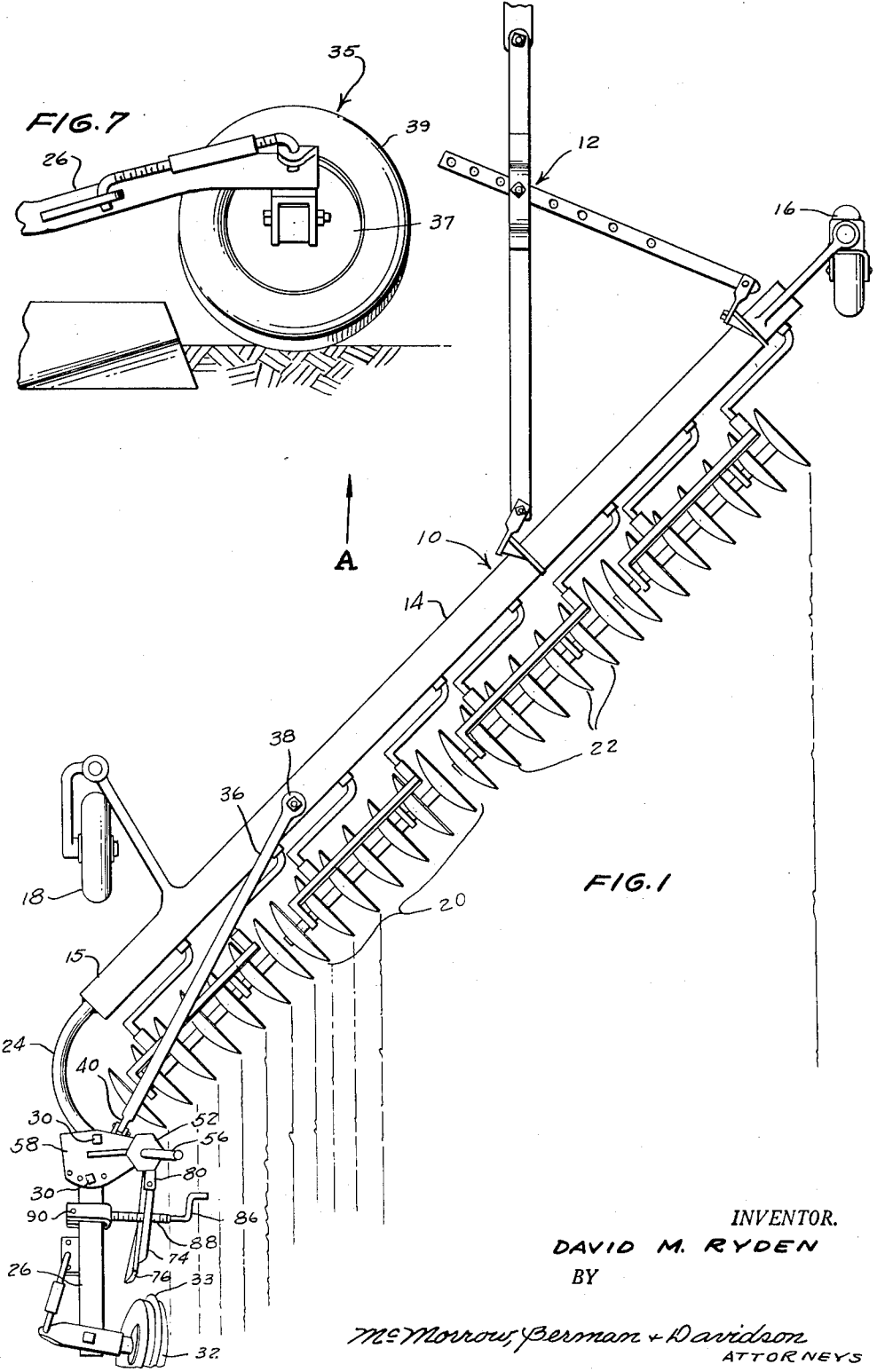
July 17, 1956 — D. M. RYDEN — 2,754,743
SIDE DRAFT CONTROL ATTACHMENT
Filed May 4, 1954 — 3 Sheets-Sheet 1
INVENTOR.
DAVID M. RYDEN
BY
McMorrow, Berman & Davidson
ATTORNEYS

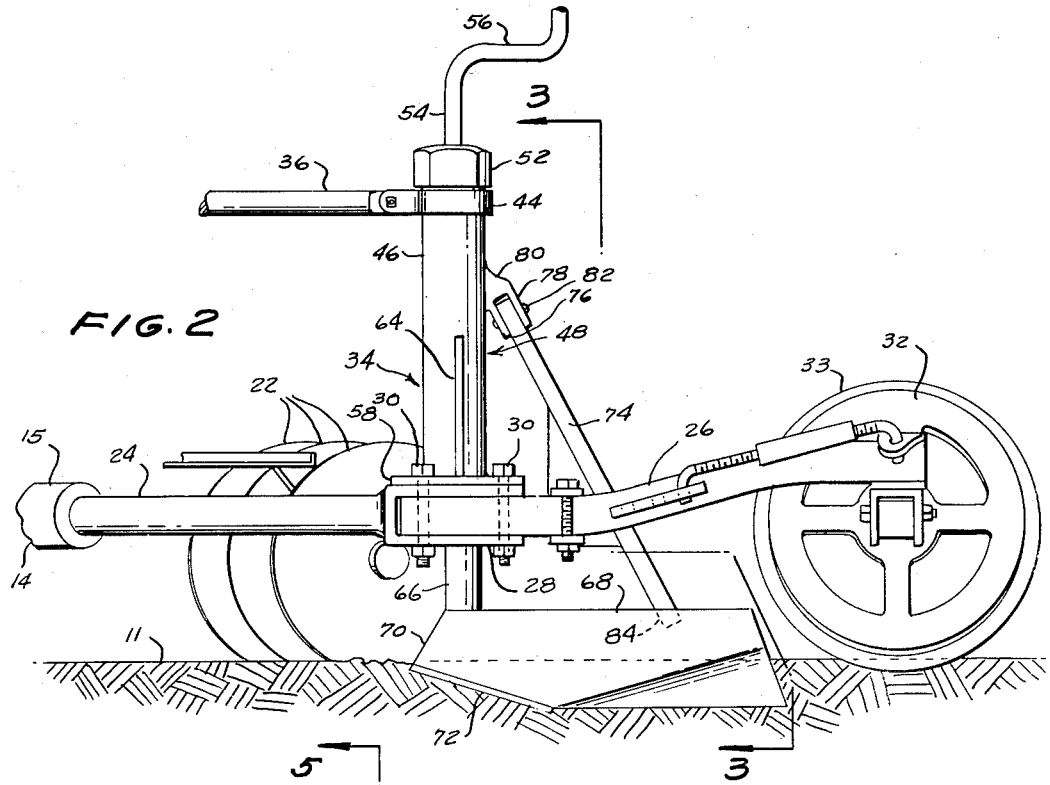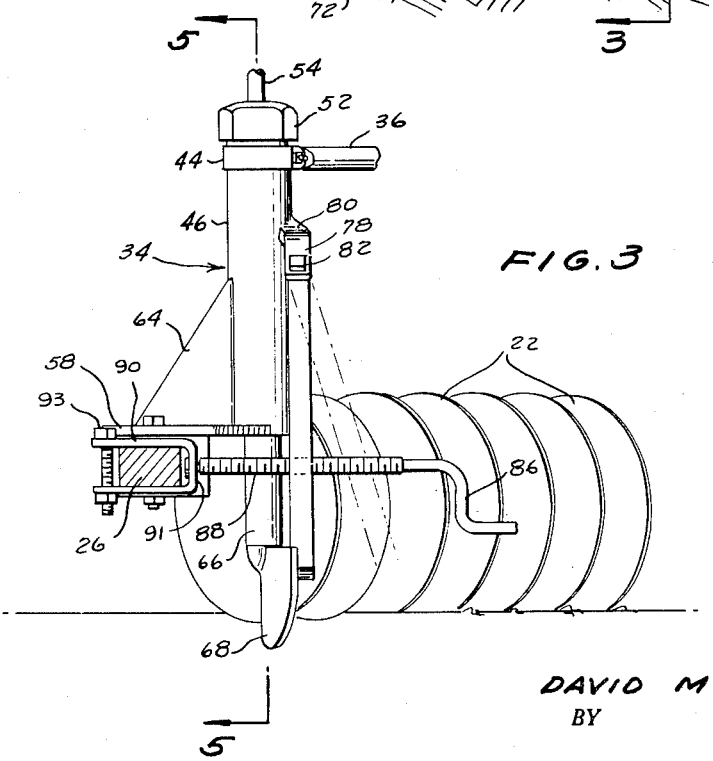

INVENTOR.
DAVID M. RYDEN
BY
McMorrow, Berman & Davidson
ATTORNEYS

United States Patent Office 2,754,743
Patented July 17, 1956

2,754,743

SIDE DRAFT CONTROL ATTACHMENT

David M. Ryden, Hallock, Minn.

Application May 4, 1954, Serial No. 427,447

5 Claims. (Cl. 97—53)

This invention relates to tractor-drawn farm implement attachments used in tilling the soil and more particularly to a side draft control attachment for such tractor-drawn implements.

One of the principal problems in the employment of the so-called one-way disc tiller for tilling the soil is the successful control of side draft on such disc implements. As a tractor pulls a disc tilling implement forward, the discs cut into the soil and turn it over to the right, in relation to the direction of movement of the tractor, and as this tilling operation is accomplished the disc attachment or implement swings to the left which is undesirable since motion in the forward direction provides optimum results. This motion to the left or side is therefore called "side draft."

This side draft is undesirable because as the discs swing in a sideward direction, they no longer cut into and turn the soil. The discs merely roll on top of the soil much in the same manner as a wheel, hence failing to accomplish their purpose. Also, the soil throughout any given field is not the same, in some places it is very soft and loose while in others it is very hard. With this condition prevailing, the discs cut into the soft soil but swing sideways on the harder ground and do not cut into and till or turn the soil. The sideward motion, or the side draft, and the pressure of the discs also pulls the back end of the tractor in the same direction as the side draft which causes the front end of the tractor to swing to the right and, hence, it is very difficult for the tractor operator to keep traveling in a straight line down the field to be tilled.

Several attempts have been made to control this side draft such as the use of a furrow wheel which is a wheel that runs in the groove or furrow which the last disc on the left of the disc implement cuts. Where the ground is hard or packed the side draft pressure pushes the furrow wheel up and out of the furrow and the furrow wheel then is no longer operative to hold the disc implement in the proper cutting position or angle in relation to the prime mover or tractor. Also, attempts have been made to keep the furrow wheel in the furrow by adding weights on the frame of the disc implement and on the furrow wheel. This has not proven successful because the small area of soil that the furrow wheel has to push against is not sufficient to resist all the side draft pressure exerted by the multiple discs, whose combined area of soil to be turned is many times greater than the area of contact afforded by the furrow wheel. Also, it puts so much weight on the wheels that it packs the soil still harder which results in a condition which makes the disc implement side draft even greater.

It is therefore the principal object of this invention to provide a side draft control attachment for farm disc implements which will maintain the furrow cutting discs in their proper angular relation with respect to the prime mover or tractor under all soil conditions.

It is a further object of this invention to provide a side draft control attachment which is of simple yet but very durable construction and is capable of being readily employed with any of the existing disc implements used for tilling the soil.

It is a still further object of this invention to provide a side draft control attachment which will enable the operator to turn a corner without placing an undue strain upon the side draft control attachment or disc implement.

It is yet another object of this invention to provide a side draft control attachment which is adjustable as to depth of cut and also selectively adjustable with respect to the angle that the blade runs in the furrow to thereby greatly increase the control of the side draft of the disc implement as well as that of the prime mover or tractor.

Another and still further object of this invention is to provide a side draft control attachment which cuts a furrow which is clean of field trash and straw, which otherwise would clog or catch on the control device, and also cuts in its own groove in the solid or unturned soil in the bottom of the furrow thereby giving the greatest amount of holding power to counteract the side draft and enabling the side draft control device to operate with the greatest amount of efficiency.

Other objects and advantages will become apparent from the following detailed description, taken in conjunction with the accompanying drawings, wherein:

Figure 1 is a top perspective view of a tractor drawn farm disc implement having the side draft control attachment of the present invention carried thereon;

Figure 2 is a side elevational view of the disc implement and the side draft control mounted thereon;

Figure 3 is a sectional view taken on line 3—3 of Figure 2;

Figure 7 is a side elevational view of a modified form of the invention using a rubber tired furrow wheel.

Figure 5:
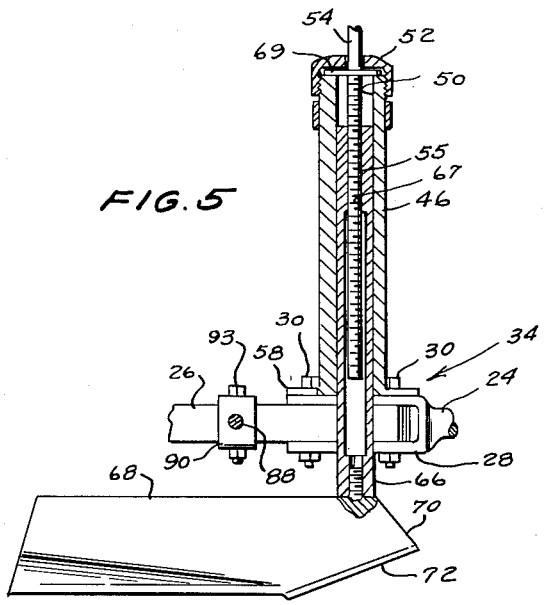
Figure 5 is a vertical cross sectional view taken on line 5—5 of Figure 3.
Figure 4:
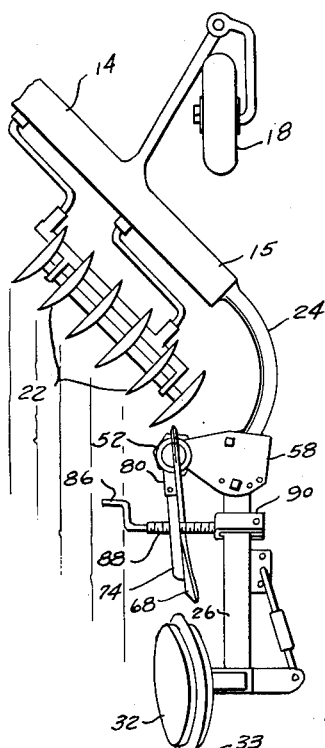
Figure 4 is a perspective view of the left-hand portion of the disc implement as shown in Figure 1, but emphasizing the relation of the side draft control attachment with respect to the cutting discs and furrow wheel of the implement.

With continued reference to the drawings, there is shown in Figure 1 a disc implement, generally indicated at 10, for use in tilling the soil. The implement 10 is provided with the conventional draft means 12 for attachment to a tractor or prime mover, an elongated tubular frame 14 disposed horizontally above the ground surface and supported on ground wheels 16 and 18. The frame 14 also carries a plurality of gangs of discs or disc harrows 20, each of which gang includes a plurality of individual harrow discs 22 adapted to till the soil by cutting furrows therein as the implement is moved forward in the direction of the arrow A by the tractor or prime mover. It will be noted, that the frame 14 is normally disposed in angular relation to the forward direction of movement so that the discs will cut individual furrows and turn the soil to the right, as viewed in Figure 1. The frame 14 includes an arcuate branch or arm 24 at one end 15 thereof, the left-hand end as viewed in Figure 1, which is so formed as to extend outwardly and rearwardly from the longitudinal center line of the frame 14.

Secured at the terminal or free end of the branch 24 is a furrow wheel support arm 26 which is received in the bifurcation 28 formed at the terminal or free end of the branch 24 and secured therein at one end by bolts 30. The other end of the wheel support arm 26 remote from the branch 24 carries thereon the conventional type of furrow wheel 32. The relation of the wheel support arm 26 and the furrow wheel 32 carried thereon is such that the furrow wheel will have its outwardly projecting annular flange 33, formed centrally upon the circumference of the furrow wheel 32, ride in the furrow made by the last disc 22 on the left-hand side of the implement 10, as viewed in Figure 1. Also, it will be noted that the wheel support arm is so mounted in the terminal or free end of the branch 24 that it extends in a plane generally parallel to the direction of movement of the implement as indicated by the arrow A in Figure 1.

Figure 6:
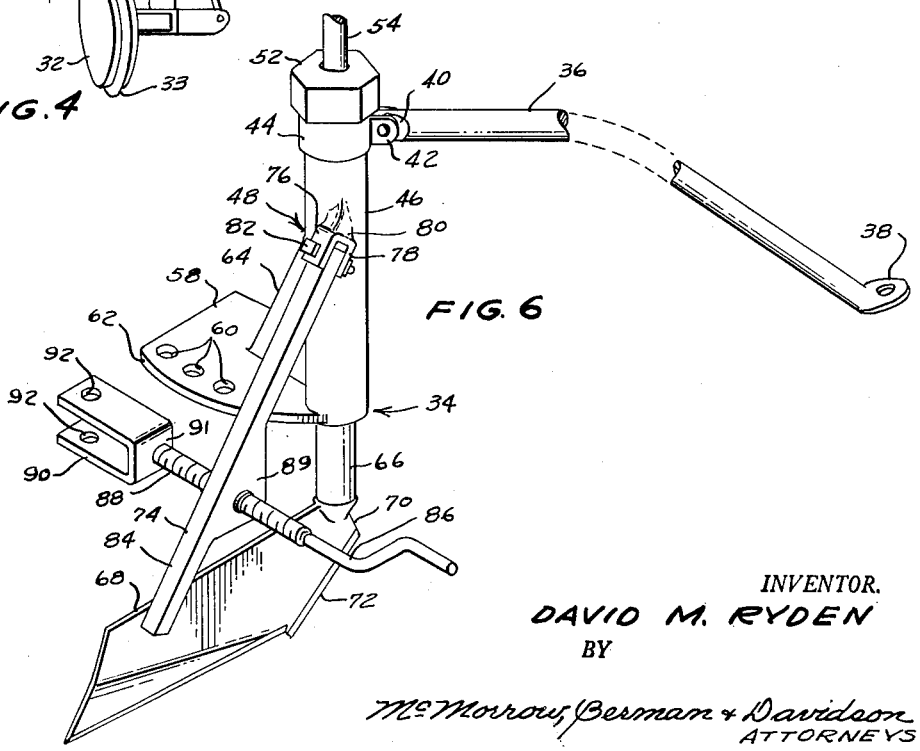
Figure 6 is perspective view of the side draft control attachment itself.

The structure of the disc implement thus far described is of the conventional type, and as such, forms no part of this invention. The side draft control attachment embodying this invention is generally indicated at 34 in Figure 6. The side draft control attachment 34 includes a support rod 36 one end 38 thereof being flattened and provided with a central opening through the flat laterally projecting portion formed at this end for attachment upon the frame 14, intermediate the ends of the frame but more closely adjacent the end of the frame having the branch or arm 24. The support rod 36 extends upwardly and outwardly from the frame 14 and has its other end 40 secured between the laterally projecting ears 42 formed as the terminal ends of a clamping collar 44 encirclingly carried by the upstanding, tubular body 46 of an attachment bracket, generally indicated at 48. The cylindrical body 46 is provided with a longitudinal bore 50 centrally therethrough and is threaded externally at its other end to receive thereon a cap nut 52 having an aperture centrally therethrough to receive the lower end of a stem 54 of a crank handle 56. At its lower end, the hollow cylindrical body portion 46 carries a laterally extending attachment plate 58 extending perpendicularly to the longitudinal axis of the body 46 and having a plurality of holes 60 drilled therethrough adjacent the arcuate side 62 of the plate. A reinforcing rib 64 extends between the body 46 and the upper face of the attachment plate 58. The attachment plate 58 is adapted to overlie the wheel support arm 26 so that one of the holes 60 may be selected to register with the aligned holes through the bifurcated end 28 of the branch or arm 24 with the attachment plate 58 in contact with the upper surface of the uppermost leg of the bifurcated end so that the bolts 30 securing the wheel support arm 26 to the branch 24 will also serve to secure the attachment plate 58 on the bifurcated end 28 of the branch 24 so that the side draft control attachment 34 will be carried upon the frame 14 at the terminal end of the branch or arm 24 thereof and the support rod 36 acting as a reinforcing brace between the attachment 34 and the frame 14.

Slidably received within the bore 50 of the body 46 is a hollow tubular pivot column sleeve 66, the sleeve 66 being rotatable within the bore 50 about its axis. The pivot column sleeve 66 carries at its lower end a side draft control blade 68 in the form of a heavy steel plate, which may vary in length depending upon the size of disc implement upon which it will be employed, the pivot column sleeve 66 being located adjacent one end 70 of the blade 68, this end 70 will be referred to as the front or forward end since it will be normally facing toward the prime mover or tractor and the blade 68 so arranged that the end 70 will point in the direction of travel of the implement 10. As best seen in Figure 5, the front end 70 of the blade 68 has its upper portion inclined upwardly and rearwardly while the lower portion 72 is inclined downwardly and rearwardly and is beveled to a sharp or knife edge so that the lower portion or knife edge 72 will cut into the ground or soil 11 as shown in Figure 2.

That portion of the crank handle stem 54 which extends into the bore 50 through the central opening in the guide cap nut 52, indicated by the reference numeral 55, is provided with external threading which is received in the top end of the threaded bore 67 of the pivot column sleeve 66 so that upon rotation of the crank handle 56, the side draft control blade 68, which is generally of elongated rectangular shape, may be lowered or raised. In order to maintain the depth control crank, crank handle 56 and stem 54, in a fixed adjusted position with respect to the selected depth of cut of the blade 68, there is a circular flange or collar 69 of a larger diameter than the inside diameter of the bore 50 secured on the stem 54 and resting on the top end of the body 46 and maintain thereon by the guide cap nut 52 so that the depth control crank can be rotated freely but is kept in a fixed position with respect to the desired depth of cut imparted to the blade 68 by the rotation of the depth control crank.

From the foregoing, it will be apparent that there has been provided in the side draft control attachment 34, a side draft control blade which is freely rotatable about a vertical axis centrally through the attachment bracket 48 which carries the pivot column sleeve 66 to which the blade 68 is secured at its lower end, and in which the depth of cut of the blade 68 into the soil or ground 11 may be selectively adjusted by rotation of the depth control means. Thus, in operation, the individual harrow discs 22 in each of the gang of discs will remain in their adjusted angular relation to the forward direction of movement of the implement 10 not only by the central rim or flange 33 on the furrow wheel 32 riding in the endmost furrow on the left, as viewed in Figure 1, but also positively maintained in the proper angular relation by the knife or cutting edge 72 on the blade 68 cutting into the solid or untilled ground 11 of the furrow made by the disc 22 at the extreme left (Figure 1) since the blade 68 is located directly in front of the furrow wheel 32 as viewed in Figure 1, and directly in line with the side draft control blade 68 disposed between the last disc 22 on the extreme left of the implement 10 and the furrow wheel 32 extending parallel to the direction of travel of the implement. In effect, the control blade 68 provides a guide groove cut into soil which has not been turned or tilled by the endmost one of the discs, adjacent the blade, and in which groove the furrow wheel 32 will ride to prevent side draft of the implement 10.

It will be appreciated that the weighted furrow wheel 32 may be replaced by a wheel, generally indicated at 35, having a wheel disc 37 rotatably carried by the wheel support arm 26 at the end thereof remote from the branch 24, and a rubber tire 39 is mounted on the disc 37. The wheel 35 will preferably be incorporated into the implement 10 to replace the weighted furrow wheel 32 when the draft control attachment 34 is placed on the implement at the point of implement manufacture. With the rubber tired wheel 35, it will be feasible to transport the disc implement 10 over surfaced roads with damage to the roads whereas with the weighted furrow wheel 32 this would not be possible. Also, the use of the wheel 35 will eliminate the unnecessary weight of the furrow wheel 32 resulting in a saving of about seven hundred pounds in weight and saving the cost of this excess material in the manufacture of the implement while still retaining complete side draft control.

The action of the control blade 68 will be resisted along the entire length of the control blade 68 as compared to the relatively small area of contact of the rim 33 on the furrow wheel 32. In addition, the control blade 68 will continue to cut into the ground 11 regardless of its degree of hardness or softness so as to maintain the gangs of discs 20 in their soil-turning position at the desired depth regardless of the specific condition of the ground or soil 11, and is arranged with respect to the implement 10 as to be maintained to cut the untilled soil in a direction approximately parallel to the direction of movement indicated by arrow A.

As hereinbefore described, the control blade 68 is free to rotate about the longitudinal or vertical axis through the housing 46 of the attachment bracket 48, but it would be undesirable for the blade to rotate so that its leading edge 70 is moved to the left as viewed in Figure 1 since this is the direction in which the side draft of the discs tend to move the implement 10. In order to prevent movement of the control blade in this direction, there is provided a stop arm 74 secured at its upper end between the laterally projecting arms 76 and 78 of a bracket 80 secured upon the exterior surface of the body 46 of the attachment bracket 48 by a bolt 82. The arms 76 and 78 of the bracket 80 extend angularly from the body 46 and open downwardly so that the end of the stop arm, indicated at 84, remote from the bracket 80 will intersect the arcuate path of movement of the blade 68 about the vertical axis upon which it rotates and thereby prevent the control blade 68 from rotational movement in a counter-clockwise direction as viewed in Figure 1. Hence, the angle at which the leading edge 70 of the control blade 68 cuts into the ground or soil 11 may be determined by the position of the stop arm 74 with relation to the control blade 68. In order to selectively adjust the angle at which the control blade 68 cuts into the soil, there is provided an adjusting means comprising an angle adjustment crank 86 the shank portion 88 thereof being provided with external threads and received in an internally threaded opening through an ear or projection 89 formed on the lower surface of the stop arm 74 intermediate its ends. A C-shaped clamp bracket 90 is secured at its bight portion 91 upon the end of the threaded shank 88 remote from the crank handle portion, and is provided adjacent the terminal ends of the legs thereof with registering holes 92. The legs of the clamp are adapted to receive the wheel support arm 26 therebetween and is secured thereon by a nut and bolt through the registering holes 92 therethrough, as clearly shown in Figure 3. The bolt 93 which secured the clamp bracket 90 upon the wheel support arm 26 is placed outwardly of the side edge of the support arm 26 remote from the stop arm 74.

Thus, by rotating the angle adjustment crank 86, the position of the stop arm 74 may be selectively adjusted since it will move in an arcuate path about the pivot bolt or pin 82 which secures the upper end of the stop arm 74 in the bracket 80. Thus, the angular position of the control blade 68 may be selectively determined by the adjusting means carried by the stop arm 74 which causes the stop arm 74 to move in its arcuate path about its pivot 82 from the solid line position in Figure 3 to the dotted line position shown therein, or to maintain the stop arm 74 in any position between the solid and broken-line positions shown in Figure 3.

The importance of the pivot column sleeve 66 will be appreciated when the disc implement goes around the field in the usual counter-clockwise direction and comes to a corner of the field and the implement turned to the left. Upon such turning at the corner it is necessary to have a pivot point between the disc implement and the blade since the stop arm 74 swings away from the blade as the turn to the left is made. This is necessary to eliminate the twisting strain that would take place, with the blade embedded in the ground if it were held rigid with the stop arm to the frame of the disc at their point of contact since this would result in a considerable force upon the blade in a direction normal to its direction of travel and along the entire length of the blade so that the making of such turn would be very difficult as well as placing a twisted strain upon the blade with the resultant possibility of damage thereto. The principal function of the stop arm 74 is to prevent the control blade 68 from pivoting to the right, as viewed in Figure 1, and by so preventing the pivoting of the control blade to the right it is not possible for the disc implement to swing to the left. Hence, it is possible to control all of the side draft of the disc implement. Also it may be a distinct advantage to have the control blade 68 run with the back end thereof, that is the end remote from the leading edge or end 70, a few degrees to the left to increase the control of the side draft of the disc implement as well as of the tractor or prime mover.

It will be apparent from the foregoing, that there has been provided in a disc implement for tilling the soil of the type having a frame, a side draft control attachment carried by the frame at one end thereof comprising a draft control blade adapted to cut into the untilled soil to prevent side draft of the implement, the control blade being disposed at one end 15 of the frame and rotatably mounted in the bore 50 of the body 46 in the attachment bracket 48 so as to be pivotally mounted to move in an arcuate path. Also, and more specifically, there has been provided in a disc implement for tilling soil of the type having a frame, a plurality of gangs of discs carried by said frame and draft means carried by the frame for attachment to the prime mover, an improvement residing in the provision of a side draft control attachment therefor which comprises an attachment bracket carried by the frame at one end thereof including an upstanding body having a central bore longitudinally therethrough and an attachment plate carried by the body adapted to be secured upon the frame, and a side draft control blade mounted in the bore in the body in the lower end thereof for pivotal movement about the body in an arcuate path, and a stop means in the form of the stop arm 74 carried by the body 46 which intersects the path of movement of the blade in one direction, and as previously indicated, the control blade 68 is disposed at one end 15 of the frame 14 and the gangs of discs 20 and is adapted to cut into the untilled soil of the furrow to control the side draft of the implement caused by the angular disc position of the discs in each of the gangs to the direction of movement as the implement is pulled forward by a prime mover.

An important feature of this invention to be appreciated is that the control blade 68 cuts into the solid or unturned soil in the furrow of the disc 22 at the extreme left of the implement, as viewed in Figure 1, so that the control blade, and furrow wheel 32, where such wheel is present, will be out of contact with all of the usual field trash thus positively eliminating previous field trash troubles encountered with side draft control devices now in use.

While there has been shown and described the preferred embodiment of the invention, it is to be understood that the structure is susceptible to change and modification within the practicability of the invention and therefore should be limited only by the scope of the claims appended hereto.

What is claimed is:

1. In a disc implement for tilling soil of the type having a frame, a furrow wheel carried by said frame at one end thereof, a plurality of gangs of discs carried by said frame and draft means carried by said frame for attachment to a prime mover; the improvement residing in a side draft control attachment therefor carried by said frame adjacent said one end, said attachment comprising an attachment bracket carried by said frame at said one end thereof including an upstanding body having a central bore longitudinally therethrough, an attachment plate carried by said body and secured upon said frame, a side draft control blade mounted in the bore in said body at the lower end thereof for free pivotal movement about said body in an arcuate path, and a stop means carried by said body intersecting the path of movement of said blade in one direction, said control blade disposed adjacent said one end of said frame and spaced outwardly from the gang of discs adjacent said one end of the frame and ahead of said furrow wheel and adapted to cut into the untilled soil of a furrow to control side draft of said implement as it is moved forward by a prime mover.

2. In a disc implement for tilling soil of the type having a frame, a plurality of gangs of discs carried by said frame and draft means carried by said frame for attachment to a prime mover; the improvement residing in a side draft control attachment therefor comprising an attachment bracket carried by said frame at one end thereof including an upstanding body having a central bore longitudinally therethrough, an attachment plate carried by said body secured upon said frame, a side draft control blade mounted in the bore in said body at the lower end thereof for pivotal movement about said body in an arcuate path, and a stop means carried by said body intersecting the path of movement of said blade in one direction, said control blade disposed at one end of said frame and gangs of discs and adapted to cut into the untilled soil of a furrow to control side draft of said implement as it is moved forward by a prime mover, adjustable means on said stop means to selectively vary the point of intersection of said stop means with the path of movement of said blade.

3. In a disc implement for tilling soil of the type having a frame, a plurality of gangs of discs carried by said frame and draft means carried by said frame for attachment to a prime mover; the improvement residing in a side draft control attachment therefor comprising an attachment bracket carried by said frame at one end thereof including an upstanding body having a central bore longitudinally therethrough, an attachment plate carried by said body and secured upon said frame, a side draft control blade mounted in the bore in said body at the lower end thereof for free pivotal movement about said body in an arcuate path, and a stop means carried by said body intersecting the path of movement of said blade in one direction, said control blade disposed adjacent said one end of said frame and spaced outwardly from the gang of discs adjacent said one end of the frame and adapted to cut into the untilled soil of a furrow to control side draft of said implement as it is moved forward by a prime mover, adjustable means on said stop means to selectively vary the point of intersection of said stop means with the path of movement of said blade, and a rubber tired wheel disc carried by said one end of the frame.

4. In a disc implement for tilling soil of the type having a frame, a furrow wheel carried by said frame at one end thereof, a plurality of gangs of discs carried by said frame and draft means carried by the frame for attachment to a prime mover; the improvement residing in a side draft control attachment carried by said frame adjacent said one end thereof, said attachment comprising an attachment bracket carried by said frame at said one end thereof including a body having a bore longitudinally therethrough, an attachment plate carried by said body and secured upon said frame, a side draft control blade mounted in the bore in said body at the lower end thereof for free pivotal movement about said body in an arcuate path, said control blade being disposed adjacent said one end of the frame ahead of said furrow wheel and spaced outwardly from the gang of discs adjacent said one end of the frame and adapted to cut into untilled soil of a furrow to control side draft of said implement as it is moved forward by a prime mover.

5. In a disc implement for tilling soil of the type having a frame, a furrow wheel carried by said frame at one end thereof, a plurality of gangs of discs carried by said frame and draft means carried by the frame for attachment to a prime mover; the improvement residing in a side draft control attachment carried by said frame adjacent said one end thereof, said attachment comprising an attachment bracket carried by said frame at said one end thereof including a body having a bore longitudinally therethrough, an attachment plate carried by said body and secured upon said frame, a side draft control blade mounted in the bore in said body at the lower end thereof for free pivotal movement about said body in an arcuate path, said control blade being disposed adjacent said one end of the frame ahead of said furrow wheel and spaced outwardly from the gang of discs adjacent said one end of the frame and adapted to cut into untilled soil of a furrow to control side draft of said implement as it is moved forward by a prime mover, said control blade providing a guide groove in the untilled soil ahead of the furrow wheel, said furrow wheel adapted to ride in the guide groove to prevent side draft of the implement.

References Cited in the file of this patent

UNITED STATES PATENTS

| | | |
|---|---|---|
| 759,489 | Weeks | May 10, 1904 |
| 1,014,987 | Weiler | Jan. 16, 1912 |
| 2,554,741 | Johnston | May 29, 1951 |

FOREIGN PATENTS

| | | |
|---|---|---|
| 9,514 | Great Britain | 1912 |
| 253,662 | Italy | July 1, 1927 |
| 21,910 | Netherlands | May 15, 1930 |
| 993,532 | France | July 25, 1951 |